(12) United States Patent  (10) Patent No.: US 6,719,301 B2
Chen et al.  (45) Date of Patent: Apr. 13, 2004

(54) SPRING BACK FIRE RING

(75) Inventors: Colin Chen, Barrington Cook, IL (US); Frank W. Popielas, Naperville Dupage, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/975,175

(22) Filed: Oct. 11, 2001

(65) Prior Publication Data

US 2003/0071424 A1 Apr. 17, 2003

(51) Int. Cl.⁷ .................................................. F02F 11/00
(52) U.S. Cl. ........................ 277/601; 277/594; 277/600
(58) Field of Search ................ 277/600, 601, 277/593, 594

(56) References Cited

U.S. PATENT DOCUMENTS

| | | |
|---|---|---|
| 1,339,636 A | 5/1920 | Tulloch |
| 3,519,281 A | 7/1970 | Teucher et al. |
| 3,656,769 A | 4/1972 | Jelinek et al. |
| 3,930,656 A | 1/1976 | Jelinek |
| 4,348,032 A | 9/1982 | Hanson et al. |
| 4,351,534 A | 9/1982 | McDowell |
| 4,518,168 A | 5/1985 | Belter |
| 4,605,236 A | 8/1986 | Tsuchihashi et al. |
| 4,796,897 A | 1/1989 | Inciong |
| 5,267,740 A | 12/1993 | Stritzke |
| 5,341,779 A | 8/1994 | Chen et al. |
| 5,518,257 A * | 5/1996 | Breaker ............ 277/612 |

OTHER PUBLICATIONS

International Application Published Under Patent Cooperation Treaty—WO 95/02772—Publication Date Jan. 26, 1995.

* cited by examiner

Primary Examiner—Alison K. Pickard
(74) Attorney, Agent, or Firm—Rader, Fishman & Grauer, PLLC

(57) ABSTRACT

A spring back fire ring is provided in a gasket assembly that is used for sealing combustion openings. In addition to the spring back fire ring, the gasket assembly includes a main gasket body and upper and lower gasket layers. The spring back fire ring has first and second ends. The first end is biased upwardly around the periphery of the combustion openings. The second end is positioned proximate to the main gasket body. In one embodiment, the second end is integral with the main gasket body.

22 Claims, 4 Drawing Sheets

SPRING BACK FIRE RING

FIELD OF THE INVENTION

The present invention relates generally to a fire ring. More particularly, the present invention relates to spring back fire ring wherein the distal end of the fire ring serves as a spring washer to follow the cylinder head movement during the operation of the engine.

BACKGROUND OF THE INVENTION

Gaskets are often used as seal between mating metal surfaces. One common application involves the placement of a gasket between a head and an exhaust manifold of an internal combustion engine. Such gaskets are considered high temperature gaskets since they provide a seal, which prevents the byproducts of combustion exiting the engine from escaping into the engine compartment of a vehicle.

One typical problem that occurs with such gaskets is insuring effective sealing, especially where "thermal push" occurs, i.e., where an improperly cooled zone of the engine, such as the head, will grow as the result of overheating and then excessively compress the sealing means, such as a fire ring. While the gasket will seal effectively under excessive compressive loads, once the engine cools down, the sealing effect of the gasket in the excessively compressed areas may be lost. Upon subsequent use of the engine, the gasket area that had been excessively compressed will not seal until the area becomes overheated. Accordingly, the gasket will not properly seal, resulting in a significant loss of compression and power, which may lead to long term damage to the engine.

Various attempts have been made to prevent improper compression resulting from thermal push. For example, metal shims have been used. However, the shims require precise positioning. Another attempt includes the use of a metallic plate head gasket with embossments around the combustion opening. However, metallic plates require specific attachments and also require additional openings that must mate properly with coolant openings and the like.

Another attempt to prevent improper compression has been to employ a fire ring bonded on the end of the main gasket body at the combustion openings. The fire ring includes annular feet to properly seat the fire ring between the cylinder block and the cylinder liner. To provide adequate sealing, the prior art fire ring straddles the cylinder block and cylinder liner to seal the combustion gases, with at least one sealing foot on the cylinder block and one sealing foot on the cylinder liner. However, because the fire ring is bonded to the main gasket body, additional manufacturing steps must be taken, thereby increasing production costs. Moreover, there is nothing to insure that the fire ring will follow the cylinder head movement during operation of the engine after being subjected to excessive heat.

Accordingly, there exists a need for an improved, low-cost fire ring that achieves reliable sealing for combustion bore openings.

SUMMARY OF THE INVENTION

The present invention is directed to a gasket assembly for sealing mating components in an internal combustion engine that includes an improved low-cost spring back fire ring. In accordance with the invention, the gasket assembly includes a main gasket body that has at least one combustion opening, and at least upper and lower gasket layers with combustion openings that generally correspond to the combustion opening formed in the main gasket body and a spring back fire ring. The spring back fire ring is positioned in the aligned combustion openings of the main gasket body and the gasket layers.

The spring back fire ring has first and second ends. In accordance with the invention, the first end is biased upwardly from the second end. The upwardly biased first end allows the spring back fire ring to follow the cylinder head movement during operation of the engine for improved sealing around the periphery of the combustion openings. The second end of the spring back fire ring is positioned proximate to the periphery of the main gasket body. In one preferred embodiment, the second end of the spring back fire ring is integral with the main gasket body such that the main gasket body and the spring back fire ring are formed as a one-piece constant material member. Forming the main gasket body and the spring back fire ring from a single material advantageously serves to eliminate a manufacturing operation.

The spring back fire ring may also be provided with control beads. Preferably, a first control bead is provided that extends upwardly from a top surface of the spring back fire ring and a second control bead is provided that extends downwardly from a bottom surface of the spring back fire ring spaced laterally from the first control bead. The opposing and laterally spaced control beads provide additional sealing for the spring back fire ring.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
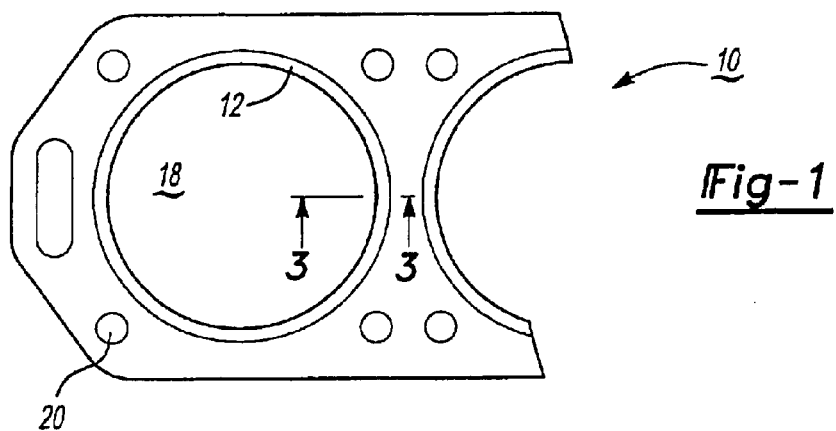
FIG. 1 is a partial plan view of a head gasket assembly employing a spring back fire ring in accordance with the present invention.
Figure 2:
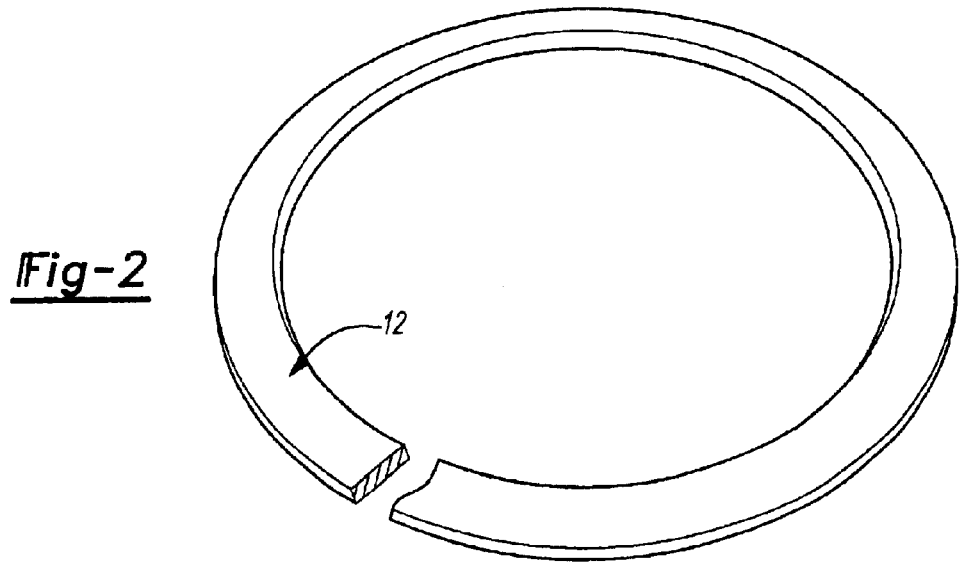
FIG. 2 is a perspective view of a first embodiment of a spring back fire ring in accordance with the present invention.

Referring now to the drawings, FIG. 1 illustrates a standard head gasket assembly 10 with which a spring back fire ring 12 of the present invention may be employed. Head gasket assembly 10 is a multi-layered gasket having upper and lower surfaces 14 and 16, respectively, and a plurality of combustion openings 18. Fluid openings (not shown) may also be provided, as well as bolt holes 20. As better seen in FIGS. 3–6, gasket assembly further includes a main gasket body 22 positioned between upper and lower gasket plates 24 and 26, respectively. Gasket assembly 10 is beneath a cylinder head (not shown) and straddling a cylinder block liner 28 and a block assembly 30.

In accordance with one aspect of the invention, upper and lower gasket plates 24 and 26 may be provided with different sealing beads 32. For example, in FIG. 3, upper gasket plate 24 includes a downwardly extending sealing bead 32a defined by arms 34 that extend downwardly and inwardly and a central section 36 disposed therebetween. Similarly, lower gasket plate 26 includes a downwardly extending sealing bead 32a. In the embodiment shown in FIG. 3, sealing beads 32a are positioned in general alignment with one another such that sealing bead 32a of upper gasket plate 24 is positioned directly above sealing bead 32a of lower gasket plate 26.

Figure 5:
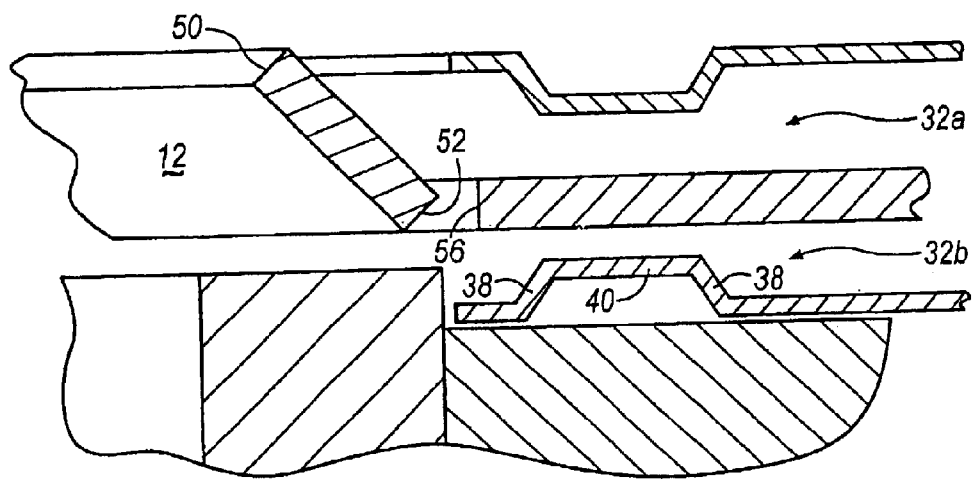
Figure 6:
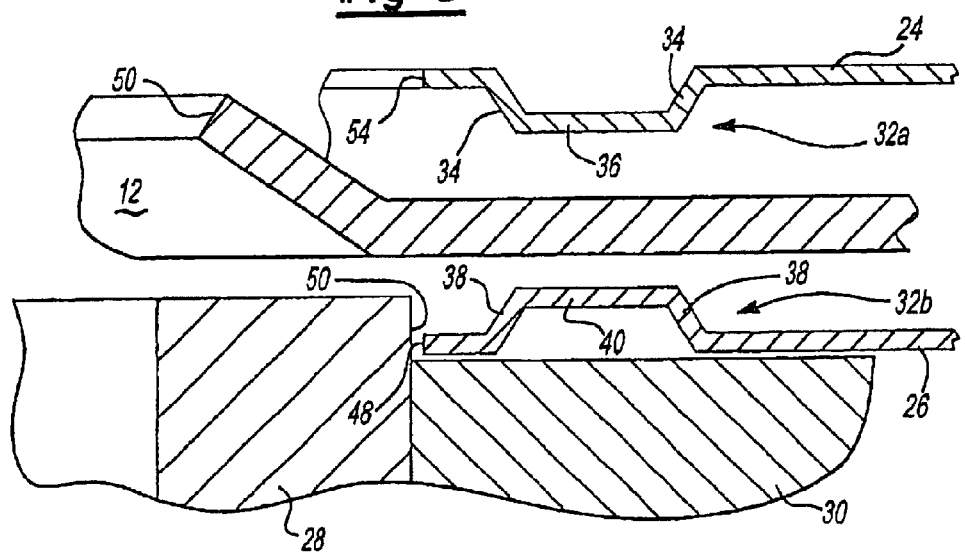
FIG. 6 is an enlarged cross sectional view of an alternative embodiment of a spring back fire ring that is integral with a main gasket body.

In another embodiment, as shown in FIGS. 5 and 6, lower gasket plate 26 is provided with an upwardly extending sealing bead 32b defined by arms 38 that extend upwardly and inwardly and a central section 40. The opposing sealing beads 32 in FIGS. 5 and 6 are positioned in general alignment with one another.

Figure 4:
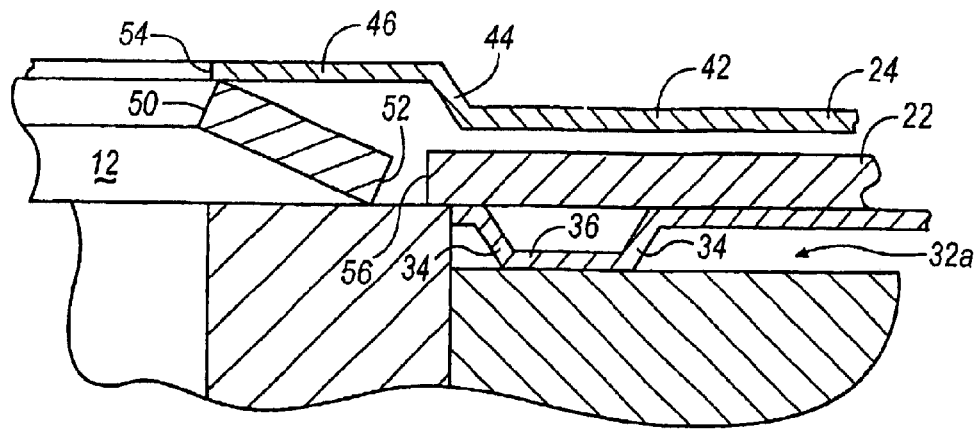

In yet another embodiment, as shown in FIG. 4, upper gasket plate 24 is not provided with a sealing bead. However, upper gasket plate 24 has a stepped portion 42, wherein a downwardly extending arm 44 spaces stepped portion 42 below an outer peripheral portion 46 of upper gasket plate 24.

In accordance with another aspect of the invention, lower gasket plate 26 may have a length that is shorter than upper gasket plate 24. For example, in FIGS. 4–6, lower gasket plate 26 has a distal end 48 that terminates adjacent an interior periphery 50 of cylinder liner 28 to fit within cylinder liner 28 to insure proper assembly of gasket assembly 10.

Figure 3:
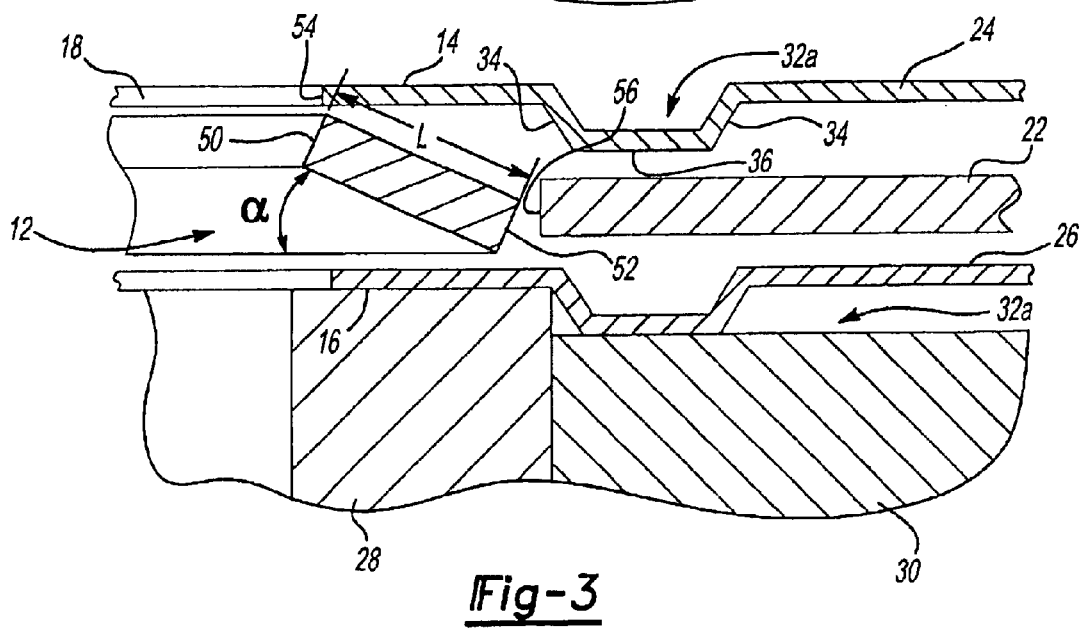
FIGS. 3–5 are enlarged cross-sectional views of a separate spring back fire ring of FIGS. 1 and 2, taken substantially along line 3—3 of FIG. 1, as positioned within head gasket assemblies using various gasket plate assemblies.

Referring to FIGS. 2–5, spring back fire ring 12 is generally planar and includes a first end 50 and a second end 52. In accordance with the present invention, first end 50 is biased upwardly around a periphery 54 of combustion opening 18. Preferably, first end 50 is biased upwardly at an angle a between 25°–65° from the horizontal. Upwardly biased first end 50 advantageously serves as a spring washer, allowing spring back fire ring 12 to follow the cylinder head movement during operation of the engine, thereby increasing sealing effectiveness. Referring to FIGS. 3–5, in a first preferred embodiment, spring back fire ring 12 may be provided as a separate member from main gasket body 22 with second end 52 being positioned proximate to a peripheral edge 56 of main gasket body 22. Alternatively, second end 52 may be bonded to distal end 56. In the preferred embodiment, first end 50 to second end 52 has a length L that is at least 2.5 mm and 80% of the thickness of cylinder liner 28 to provide sufficient contact for first end 50 to follow cylinder head movement.

In a second preferred embodiment, spring back fire ring 12 may be provided as integral with main gasket body 22. For example, as shown in FIG. 6, spring back fire ring 12 is integrally formed with main gasket body 22 as a one-piece constant material. Providing spring back fire ring 12 integral with main gasket body 22 results in less material waste and reduces manufacturing operations.

While spring back fire ring 12 is shown having a thickness that is generally equal to the thickness of main gasket body 22, it also understood that a spring back fire ring 12 may be provided that is either thicker than main gasket body 22 or thinner than main gasket body.

Figure 7:
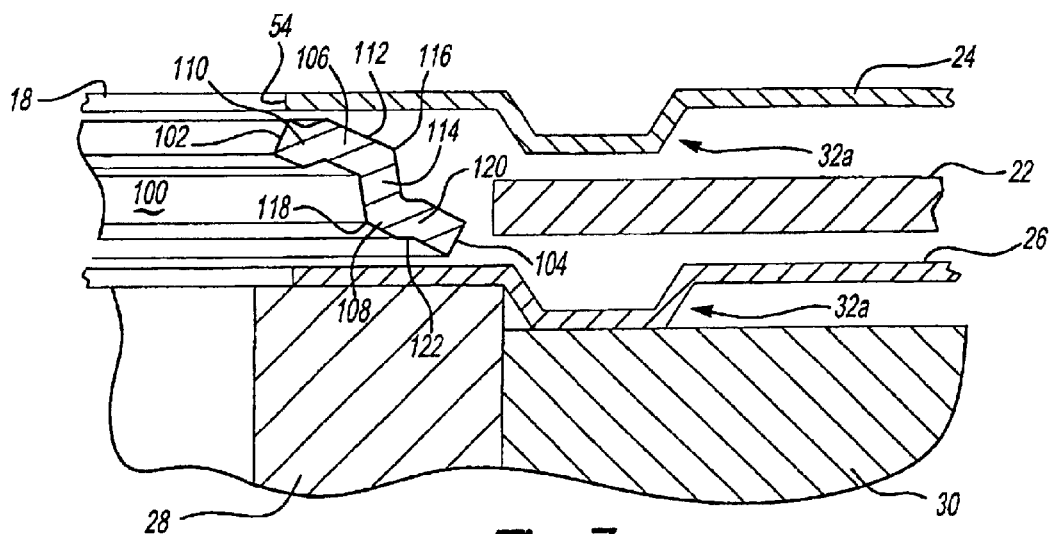
FIGS. 7–9 are enlarged cross-sectional views of a second alternative embodiment of a separate spring back fire ring having annular sealing beads positioned within head gasket assemblies using various gasket plate assemblies.
Figure 8:
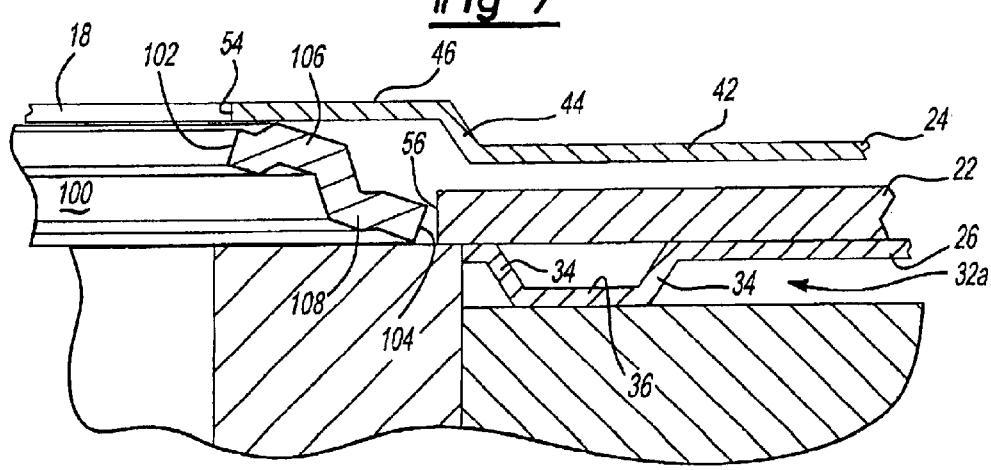
Figure 9:
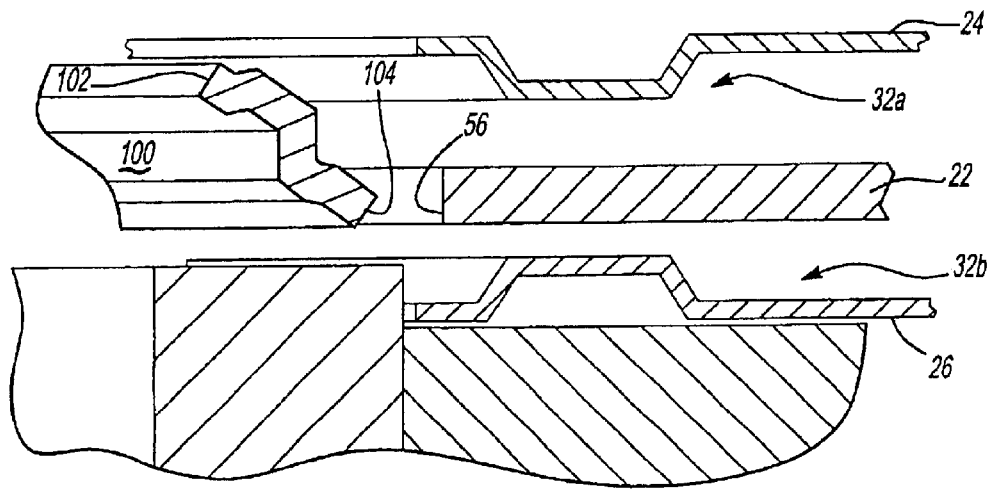

FIGS. 7–9 depict a further alternative embodiment of a spring back fire ring 100 for use with a gasket assembly 10. Spring back fire ring 100 is defined by a first end 102 and a second end 104. In accordance with the invention, first end 102 is biased upwardly around periphery 54 of combustion opening 18. The upwardly biased first end 102 serves as a spring washer, allowing spring back fire ring 12 to follow the cylinder head movement during operation of the engine. Spring back fire ring 100 may be provided as a separate member from main gasket body 22 with second end 104 being positioned proximate to distal end 56 of main gasket body 22. Alternatively, second end 104 may be bonded to distal end 56 or otherwise affixed to distal end 56.

In accordance with another aspect of the invention, spring back fire ring 100 is formed with at least one control bead 106 to provide increased sealing around combustion bore openings 18. Preferably, spring back fire ring 100 includes at least an upper 106 and lower control bead 108 that are opposing and spaced from one another. Upper control bead 106 is formed from an upwardly extending first arm 110 that terminates in an upper plateau 112. A downwardly extending second arm 114 extends from an end 116 opposite of first arm 110 to a lower plateau 118 to form a lower control bead 108. An upwardly extending third arm 120 extends from an end 122 opposite from second arm 114 to second end 104.

Figure 10:
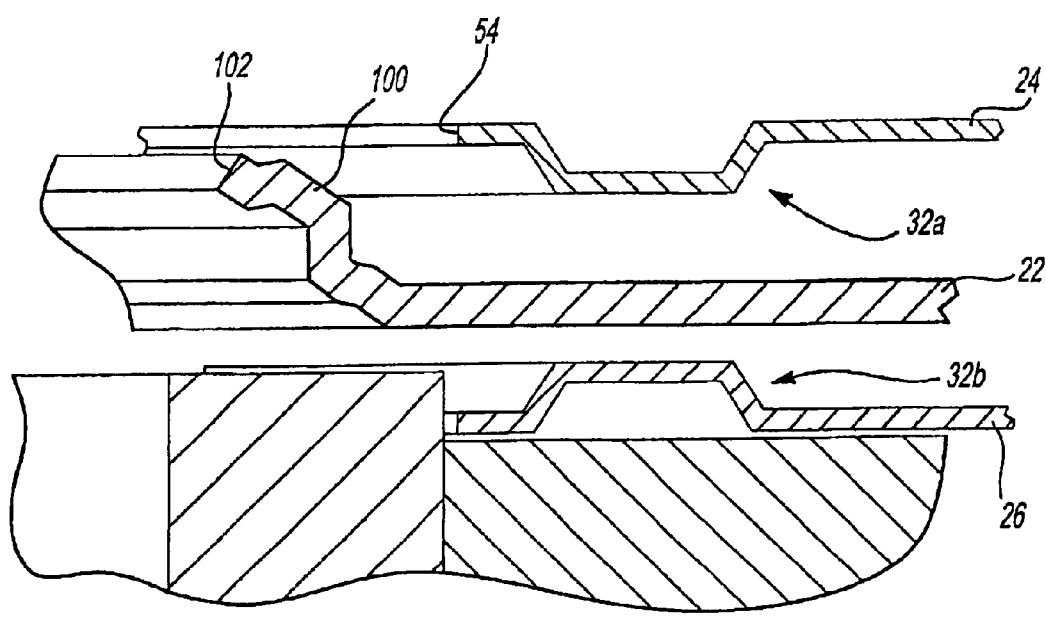
FIG. 10 is an enlarged cross-sectional view of a third alternative embodiment of a spring back fire ring having annular sealing beads, wherein the spring back fire ring is integral with a main gasket body.

In a fourth preferred embodiment, spring back fire ring 100 is integral with main gasket body 22. For example, as shown in FIG. 10, spring back fire ring 100 is integrally formed with main gasket body 22 as a one-piece constant material. Providing spring back fire ring 100 integral with main gasket body 22 results in less material waste and reduces manufacturing operations by permitting both spring back fire ring 100 and main gasket body 22 to be injection molded.

While spring back fire ring 100 is shown as having a general thickness that is generally equal to the thickness of main gasket body 22, it also understood that a spring back fire ring 100 may be provided that is either thicker than main gasket body 22 or thinner than main gasket body.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A gasket assembly for use in sealing mating components in an internal combustion engine, comprising:
    a main gasket body defined by upper and lower surfaces;
    wherein said main gasket body includes at least one combustion opening defined by a peripheral edge; and
    a single, separate generally planar spring back fire ring positioned and disposed in each combustion opening;
    wherein said spring back fire ring has a first end that is biased upwardly around the periphery of said combustion opening at an angle in a range of approximately 25–65 degrees and a second end that is positioned proximate to said peripheral edge of said main gasket body and non-integral with said main gasket body.

2. The gasket assembly of claim 1, wherein said spring back fire ring has a substantially constant thickness.

3. The gasket assembly of claim 2, wherein said spring back fire ring has a thickness that is substantially equal to a thickness of said main gasket body.

4. The gasket assembly of claim 2, wherein said spring back fire ring has a thickness that is substantially greater than a thickness of said main gasket body.

5. The gasket assembly of claim 2, wherein said spring back fire ring has a thickness that is substantially less than a thickness of said main gasket body.

6. The gasket assembly of claim 1, further including an upper gasket layer and a lower gasket layer, wherein said upper and lower gasket layers and are positioned on opposite sides of said main gasket body.

7. The gasket assembly of claim 6, wherein said upper gasket layer includes at least one annular sealing bead formed thereon.

8. The gasket assembly of claim 7, wherein said annular sealing bead extends downwardly from a top surface of said upper gasket layer.

9. The gasket assembly of claim 7, wherein said lower gasket layer includes at least one annular sealing bead formed thereon.

10. The gasket assembly of claim 9, wherein said annular sealing bead extends downwardly from a top surface of said lower gasket layer.

11. The gasket assembly of claim 6, wherein said first end of said spring back fire ring is positioned between said upper and lower gasket layers.

12. The gasket assembly of claim 1, wherein said first end of said spring back fire ring further includes at least one annular control bead formed thereon.

13. The gasket assembly of claim 1, wherein said first end to said second end has a length L that is at least 2.5 mm.

14. A gasket assembly for use in sealing mating components in an internal combustion engine, comprising:
   a main gasket body defined by upper and lower surfaces;
   wherein said main gasket body includes at least one combustion opening defined by a peripheral edge;
   an upper gasket layer and a lower gasket layer, each having at least one combustion opening that corresponds generally to the combustion openings formed in said main gasket body;
   wherein said upper gasket layer is positioned on one side of said main gasket body and said lower gasket body is positioned on a side of said main gasket body that is opposite of said upper gasket body; and
   a spring back fire ring positioned and disposed in said combustion openings of said upper gasket layer, lower gasket layer, and said main gasket body when said combustion openings of said upper, lower, and main gasket layers are aligned;
   wherein said spring back fire ring has a first end that is biased upwardly around the periphery of said combustion opening and a second end that is positioned proximate to said peripheral edge of said main gasket body, said spring back fire ring further including at least one control bead formed thereon.

15. The gasket assembly of claim 14, wherein said spring back fire ring is integral with said main gasket body such that said spring back fire ring and said main gasket body are formed as a one-piece constant material member.

16. The gasket assembly of claim 15, wherein said spring back fire ring includes a first control bead extending upwardly from a top surface of said spring back fire ring and a second control bead extending downwardly from a bottom surface of said spring back fire ring such that said first and second control beads are opposing and spaced laterally from one another.

17. The gasket assembly of claim 15, wherein said lower gasket layer includes at least one annular sealing bead formed thereon and said upper gasket layer includes at least one annular sealing bead thereon.

18. The gasket assembly of claim 17, wherein said annular sealing bead formed on said lower gasket layer extends upwardly from a top surface of said lower gasket layer and said annular sealing bead formed on said upper gasket layer extends downwardly from a bottom surface of said upper gasket layer.

19. The gasket assembly of claim 14, wherein said first end is biased upwardly at an angle in a range of 25°–65°.

20. The gasket assembly of claim 19, wherein said first end to said second end has a length L that is at least 2.5 mm.

21. A gasket assembly for use in sealing mating components in an internal combustion engine, comprising:
   a main gasket body defined by upper and lower surfaces;
   wherein said main gasket body includes at least one combustion opening defined by a peripheral edge; and
   a spring back fire ring positioned and disposed in each combustion opening;
   wherein said spring back fire ring has a first end that is biased upwardly around the periphery of said combustion opening and a second end that is positioned proximate to said peripheral edge of said main gasket body;
   wherein said first end of said spring back fire ring includes a first upwardly extending control bead and a second downwardly extending control bead that are generally opposing and spaced laterally from one another.

22. The gasket assembly of claim 21, wherein said spring back fire ring is integral with said main gasket body such that said spring back fire ring and said main gasket body are formed as a one-piece constant material member.

* * * * *